Figure 1:
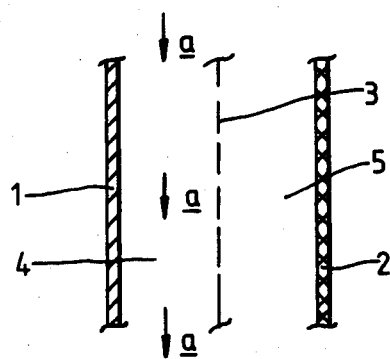

United States Patent [19]

Bridger et al.

[11] Patent Number: 4,596,641

[45] Date of Patent: Jun. 24, 1986

[54] ELECTROCHEMICAL DEIONIZATION

[75] Inventors: Nevill J. Bridger, Hermitage; Andrew D. Turner, Abingdon, both of England

[73] Assignee: United Kingdom Atomic Energy Authority, London, England

[21] Appl. No.: 675,326

[22] Filed: Nov. 27, 1984

[30] Foreign Application Priority Data

Dec. 1, 1983 [GB] United Kingdom ............... 8332088

[51] Int. Cl.⁴ ............................................. C02F 1/46
[52] U.S. Cl. ................................... 204/151; 204/282
[58] Field of Search ..................... 204/151, 150, 282

[56] References Cited

U.S. PATENT DOCUMENTS

| | | | |
|---|---|---|---|
| 3,124,520 | 3/1964 | Juda | 204/151 |
| 3,533,929 | 10/1970 | Evans et al. | 204/149 |
| 4,326,935 | 4/1982 | Moeglich | 204/151 |
| 4,389,297 | 6/1983 | Korach | 204/282 |

FOREIGN PATENT DOCUMENTS 1266507 3/1971 United Kingdom ............... 204/282

Primary Examiner—John F. Niebling
Assistant Examiner—B. J. Boggs, Jr.
Attorney, Agent, or Firm—Larson and Taylor

[57] ABSTRACT

An electrochemical extraction method comprises establishing a cell of the form working electrode: flowing aqueous electrolyte solution: second electrode. The working electrode includes an ion exchange material and the second electrode may include ion exchange material. D.C. potential is applied to the cell to adsorb ions onto the working electrode and cell polarity is subsequently reversed to elute the adsorbed ions.

The cell is separated by a cell divider, e.g. in the form of an ion selective membrane, into first and second electrolyte compartments and the solution is passed through the compartment adjacent the working electrode to effect adsorption and, where the second electrode includes ion exchange material, solution is passed through the compartment adjacent the second electrode to effect desorption.

7 Claims, 2 Drawing Figures

ELECTROCHEMICAL DEIONIZATION

This invention relates to the electrochemical removal of ions from aqueous solutions.

The electrochemical removal of ions from aqueous solutions, sometimes referred to as electrochemical deionization, is known. See, for example UK Patent Specification No. 1 247 732 and its corresponding U.S. Pat. No. 3,533,929. Basically, it involves establishing an electrochemical cell comprising the aqueous solution as electroyte, a working electrode and a counter electrode, where at least the working electrode incorporates an ion exchange material such as a resin, and applying a D.C. potential to the working electrode. To remove cations from the solution, a cathodic potential is applied to the working electrode, being a cation responsive electrode. A localised change of pH is thereby produced at the electrode due to generation of $OH^-$ ions which in turn produce active sites thereon for adsorption of cations from the aqueous solution. Regeneration of the working electrode is effected by reversal of its polarity which causes the adsorbed cations to be eluted into an aqueous medium. The cell may also be operated in analogous manner where the working electrode is anion responsive, to remove anions from an aqueous solution or, where the working electrode is cation responsive and the counter electrode anion responsive, to remove both anions and cations therefrom.

A particular advantage of electrochemical deionization is that regeneration of the working electrode may be effected without addition of chemical compounds. However, when carbon containing electrodes such as described in the above-mentioned UK patent specification are used, the counter electrode may adsorb a limited proportion of ions from the solution during regeneration of the working electrode. Thus, on subsequent reversal of polarity of the working electrode in order to adsorb ions, the counter electrode will elute its adsorbed ions into the solution. This is clearly undesirable since the purpose of the step is removal of ions and is a particularly acute problem when the aqueous solution is flowing relative to the electrodes. Thus, liquid issuing from the cell will be contaminated by eluted ions from the counter electrode. The present invention is concerned with meeting this problem.

Thus, the invention provides a method for the electrochemical removal of ions from an aqueous solution comprising establishing an electrochemical cell by contacting an aqueous electrolyte with a working electrode including an ion exchange material and a second electrode optionally including an ion exchange material, and carrying out the steps of (i) causing the aqueous solution, comprising part at least of the electrolyte, to flow in contact with the working electrode whilst operating the cell in an adsorption mode by applying a D.C. potential to the working electrode to produce active sites thereon to adsorb ions from the aqueous solution, and subsequently (ii) causing an eluant solution, comprising part at least of the electrolyte, to flow in contact with the working electrode whilst operating the cell in a regeneration mode by reversing the polarity of the working electrode thereby to elute the adsorbed ions into the eluant solution and regenerate the working electrode, wherein the electrochemical cell is separated by a cell divider into a first electrolyte compartment including the working electrode and a second electrolyte compartment including the second electrode, and, in step (i), the aqueous solution is caused to flow through the first compartment and optionally, where the second electrode includes an ion exchange material, the aqueous solution is caused to flow through the second compartment in step (ii).

The cell divider may serve to keep respective electrode products apart and, where the working electrode is a cathode in step (i), allow the pH in the first compartment to increase during that step thereby assisting adsorption.

Preferably the cell divider comprises an ion selective membrane for allowing passage therethrough of one of anions and cations and inhibiting passage therethrough of the other of anions and cations. The presence of the ion selective membrane ensures that anions or cations as appropriate are prevented from contacting the counter electrode when the cell is operated in a regeneration mode (step (ii)) thereby ameliorating the above-mentioned problem, and, where the working electrode is a cathode in step (i), prevents pH in the first compartment from falling to a low level in that step.

The invention may be carried out in a number of ways. Thus, in one embodiment, the working electrode includes a cation responsive material, the cell divider is an anion selective membrane, and the second electrode does not include cation responsive material and may therefore function only as a counter electrode. To remove cations therefrom, the aqueous solution is caused to pass through the first compartment only of the electrochemical cell.

In a second embodiment, both the working electrode and the second electrode include a cation responsive material so that the second electrode may function as a working electrode, and the cell divider is an anion selective membrane. To remove cations therefrom, the aqueous solution, is caused to pass through the first compartment in step (i) and through the second compartment in step (ii). In this way use is made of all of the volume of the cell.

The invention may be used, subject to appropriate choice of materials and operating conditions, for removal of cations (e.g. $Na^+$, $Ca^{++}$, $Mg^{++}$) or of anions (e.g. $Cl^-$, $SO_4^=$) or of both cations and anions may be used, for example, in the purification of water, including water softening, or the treatment of wastes containing heavy metal ions, or in the removal of radioactive ions from solution (e.g. $^{90}Sr^{++}$, $^{137}Cs^{++}$).

Several ways of carrying out the invention will now be described, by way of example only. Reference will be made to the accompanying drawings wherein FIG. 1 is a schematic diagram of a divided electrochemical cell having a working electrode and a second electrode in the form of a counter electrode; and FIG. 2 is a schematic diagram of a divided electrochemical cell having two electrodes; each of which is capable of being either a working electrode or a counter electrode.

Figure 2:
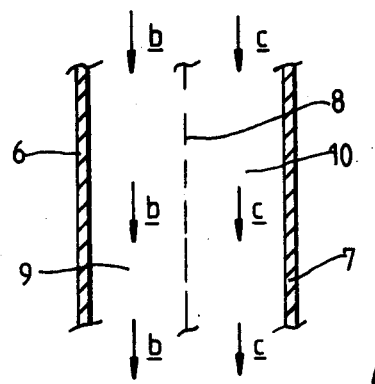

Referring to FIG. 1, an electrochemical cell comprises a working electrode 1 including a cation responsive material and a counter electrode 2 which does not include ion responsive material. The cell is divided into two electrolyte compartments by an anion selective membrane 3: a first compartment 4 defined by the working electrode 1 and the membrane 3, and a second compartment 5 defined by the counter electrode 2 and the membrane 3. The electrolyte for the cell is constituted by aqueous liquid contained in the compartments 4 and 5.

In operation of the cell shown in FIG. 1, an aqueous solution containing cations for removal (referred to generically as M+) is passed through the first compartment 4 of the cell in the direction indicated by the arrows a. The second compartment 5 contains an anion conducting electrolyte. A D.C. voltage is applied to the cell so that working electrode 1 is the cathode and the counter electrode 2 the anode. The cations are adsorbed from the solution onto the working electrode 1 in accordance with the following sequence of reactions:

Electrode 1

$$H_2O + e^- \rightarrow H(adsorbed) + OH^-$$

Resin incorporated in electrode 1

$$RCOOH + OH^- \rightarrow RCOO^- + H_2O$$

$$RCOO^- + M^+ \rightarrow RCOOM$$

(where R represents resin)

In order to regenerate the working electrode 1, an eluant solution is passed through the first compartment 4 of the cell in the direction indicated by the arrows a and the polarity of the working electrode 1 is reversed so that it becomes an anode, and correspondingly, the polarity of the counter electrode 2 is reversed so that it becomes a cathode. The adsorbed cations on the working electrode 1 are released into the eluant solution in accordance with the following sequence of reactions on the electrode 1:

$$H(adsorbed) \rightarrow H^+ + e^-$$

$$RCOOM + H^+ \rightarrow RCOOH + M^+$$

No transport of cations to the second compartment 5 is possible because of the presence of the anion selective membrane 3. Also, the presence of the membrane 3 allows the pH in the compartment 4 to rise during the adsorption step thereby aiding the adsorption of cations.

Referring to FIG. 2, an electrochemical cell comprises a first working electrode 6 and a second working electrode 7, each of which includes cation responsive material. The cell is divided into two electrolyte compartments by an anion selective membrane 8: a first compartment 9 defined by the first working electrode 6 and the membrane 8, and a second compartment 10 defined by the second working electrode 7 and the membrane 8. The electrolyte for the cell is constituted by aqueous liquid contained in the compartments 9 and 10.

Operation of the cell shown in FIG. 2 comprises two principal stages in a cycle as follows:

Stage A

An aqueous solution containing cations for removal is passed through the first compartment 9 of the cell in the direction indicated by the arrows b. An eluant solution is passed through the second compartment 10 in the direction indicated by the arrows c. A D.C. voltage is applied to the cell so that the first working electrode 6 is the cathode and the second working electrode 7 the anode. The cations are adsorbed from the aqueous solution onto the first working electrode 6 and any adsorbed cations on the second working electrode 7 released into the eluant solution (both in accordance with the sequences of reactions given above in respect of FIG. 1).

Stage B

An aqueous solution containing cations for removal is passed through the second compartment 10 of the cell in the direction indicated by the arrows c. An eluant solution is passed through the first compartment 9 in the direction indicated by the arrows b. A D.C. voltage is applied to the cell so that the first working electrode 6 is the anode and the second working electrode 7 the cathode. The cations are adsorbed from the aqueous solution onto the second working electrode 7 and any adsorbed cations on the first working electrode 6 released into the eluant solution both in accordance with the sequences of reactions given above in respect of FIG. 1.

It is highly desirable for each of stages A and B to incorporate a flush sub-stage wherein a flush solution is passed through the appropriate compartment for a short time before passage therethrough of the aqueous solution containing cations for removal.

The cell shown in FIGS. 1 and 2 may be made of components known in the art. For example, the working electrodes 1, 6 and 7 may be fabricated of an activated carbon or a weak acid ion-exchange resin bonded together with graphite powder by a suitable binder onto a carbon felt, stainless steel, platinised titanium or titanium current collector, the purpose of the graphite being to improve the electrical properties thereof. The counter electrode 2 may, for example, be fabricated of stainless steel mesh, nickel, platinised titanium, carbon or platinum.

The cells shown in FIGS. 1 and 2 may be run in series or in parallel in combination with similar cells in accordance with specific requirements. Also, control of flow of liquids therethrough may be exercised using means known in the art.

We claim:

1. In a method for the electrochemical removal of ions from an aqueous solution comprising establishing an electrochemical cell by contacting an aqueous electrolyte with a working electrode including an ion exchange material and a second electrode, and carrying out the steps of
   (i) causing the aqueous solution, comprising part at least of the electrolyte, to flow in contact with the working electrode whilst operating the cell in an adsorption mode by applying a D.C. potential to the working electrode to produce active sites thereon to adsorb ions from the aqueous solution, and subsequently
   (ii) causing an eluant solution, comprising part at least of the electrolyte, to flow in contact with the working electrode whilst operating the cell in a regeneration mode by reversing the polarity of the working electrode thereby to elute the adsorbed ions into the eluant solution and regenerate the working electrode, the improvement wherein the electrochemical cell is separated by a cell divider into a first electrolyte compartment including the working electrode and a second electrolyte compartment including the second electrode, and, in step (i), the aqueous solution is caused to flow through the first compartment.

2. A method as claimed in claim 1 wherein the cell divider comprises an ion selective membrane for allowing passage therethrough of one of anions and cations and inhibiting passage therethrough of the other of anions and cations.

3. A method as claimed in claim 2 wherein the working electrode includes a cation responsive material, the cell divider is an anion selective membrane, and the second electrode does not include cation responsive material and may therefore function as a counter electrode, and, to remove cations therefrom, the aqueous solution is caused to pass through the first compartment only of the electrochemical cell.

4. A method as claimed in claim 2 wherein both the working electrode and the second electrode include a cation responsive material so that the second electrode may function as a working electrode, and the cell divider is an anion selective membrane, and, to remove cations therefrom, the aqueous solution is caused to pass through the first compartment in step (i) and through the second compartment in step (ii).

5. A method as claimed in claim 1 for the purification of water.

6. A method as claimed in claim 1 for the removal of radioactive ions from solution.

7. A method as claimed in claim 1 wherein said second electrode comprises an ion exchange material and wherein in step (ii) the aqueous solution is caused to flow through the second compartment.

* * * * *